United States Patent [19]
McGhie et al.

[11] Patent Number: 5,112,073
[45] Date of Patent: May 12, 1992

[54] STEERING SYSTEM FOR LOAD SUPPORTING DOLLY

[75] Inventors: James R. McGhie, Eagan, Minn.; Lowell K. Pendelton, Henderson, Nev.

[73] Assignee: Trans World Crane, Inc., Eagan, Minn.

[21] Appl. No.: 573,443

[22] Filed: Aug. 27, 1990

[51] Int. Cl.⁵ .................. B60D 3/00; B62D 53/04
[52] U.S. Cl. .................. 280/404; 280/81.1; 280/111; 280/408; 280/419; 280/676
[58] Field of Search ............ 280/404, 405, 408, 405.1, 280/419, 109, 111, 113, 81.1, 676

[56] References Cited

U.S. PATENT DOCUMENTS 3,280,931 10/1966 Cahill et al. .................. 280/404

FOREIGN PATENT DOCUMENTS 1247875 8/1967 Fed. Rep. of Germany ...... 280/404

Primary Examiner—Mitchell J. Hill
Attorney, Agent, or Firm—Palmatier & Sjoquist

[57] ABSTRACT

A steerable, load-supporting dolly is provided wherein the dolly is self-steerable in response to the loading thereon. Controllable responsiveness of the steering is provided by at least one king-pin, the castor of which may be selectively varied.

17 Claims, 16 Drawing Sheets

STEERING SYSTEM FOR LOAD SUPPORTING DOLLY

BACKGROUND OF THE INVENTION

This invention relates generally to heavy duty transport vehicles for carrying heavy to massive loads on any of the widely varying roadway surfaces and, more specifically, to a dolly for use with such vehicles which is self-steerable in response to the load thereon.

Land vehicles for carrying heavy to massive loads and vehicular components therefor are disclosed in U.S. Pat. Nos. 4,453,734; 4,460,194; 4,468,048; 3,438,652 and 3,439,630. Generally, these patents disclose various vehicles, suspension systems for vehicles and wheel-/axle units for vehicles. Operator controllable steering for trailer-type vehicles for hauling heavy to massive loads is disclosed in U.S. Pat. No. 4,468,048.

Despite the refinements and improvements in the art concerning heavy duty transport vehicles, there still are some significant problems, particularly when intended payloads approach the very heavy or massive level. Some of these difficulties include: The vehicles used for transporting very heavy loads generally are massive themselves, and, in fact, may reach tremendous sizes; providing a vehicle with optimal handling and maneuverability characteristics; conforming to vehicular weight and weight distribution requirements imposed by jurisdictions through which a vehicle might pass during a long distance trip; and, conforming a vehicle's handling and maneuverability characteristics to an optimum level relative to the type of road surface upon which the vehicle is being operated.

A coinventor of the present invention, James McGhie, is the inventor or coinventor of a number of inventions related to heavy duty transport-type vehicles. For example, he is the coinventor of U.S. Pat. No. 4,943,078, issued Jul. 24, 1990. That application is directed to providing a heavy duty transport vehicle having hydraulically suspended, steerable, independent wheel and axle units which address some of the previously noted difficulties associated with vehicles used for transporting heavy to massive loads.

Typically, such vehicles include at least one tractor, a front tractor-drawn jeep, a front carriage, a rear carriage and a load unit disposed therebetween. The carriages and jeep are supported by a plurality of wheel-/axle units. A load or load unit generally has forwardly and rearwardly projecting goosenecks attached thereto for connection to respective fifth-wheel couplers on the front and rear carriages. Over all vehicle length may reach and exceed 200 feet, exacerbating some of the problems noted above.

The present invention is directed to further improving transport vehicles for transporting heavy to massive loads.

SUMMARY OF THE INVENTION

A dolly is provided for use with heavy duty transport vehicles for carrying heavy to massive loads on all types of roadway surfaces and off road as well. The dolly includes a chassis to which at least one axle is attached. A plurality of ground contacting wheels are mounted on the axle. The dolly is steerable in response to the loading thereon imposed by the load being supported by the vehicle. Additionally, the steering response of the dolly may be selectively varied to conform the dolly's handling characteristics to the speed at which the vehicle is being operated and to the type of roadway surface upon which the vehicle is being operated. The dolly is demountable whereby it may be easily removed from or attached to a vehicle depending upon the weight bearing or weight distribution requirements imposed by a jurisdiction in which the vehicle might be operated.

One of the objects of the present invention is to provide a dolly or dummy wheel/axle unit which provides supplemental load bearing capacity for vehicles used for transporting heavy loads.

Another object of the present invention is to minimize, to the fullest extent possible, point loading on the dolly, its components and the surface upon which a vehicle is being used.

Another object of the present invention is to provide a dolly for connection to a vehicle used for transporting heavy loads which bears some of the load supported by the vehicle and improves the load-carrying capability and the handling and maneuverability characteristics of such a vehicle.

An additional object of the present invention is to provide a demountable load-bearing dolly for improving the handling characteristics of vehicles used for transporting heavy loads and facilitating meeting vehicular weight and weight distribution requirements imposed by the various jurisdictions through which the vehicle may be operated.

A feature of the present invention is load-actuated steering requiring no complicated or specifically designed operator controlled or actuated steering system.

Yet another object of the present invention is to provide a dolly for use with heavy duty transport vehicles for carrying heavy to massive loads on all types of roadways that provides for the selectable and variable responsiveness of the load-responsive steering system.

A specific feature of the dolly of the present invention is a steering system which is a "king-pin" type steering system wherein the castor or inclination from vertical of the king-pins may be selectively varied, thereby controlling the responsiveness of the steering system.

Major advantages of the present invention are that the dolly may be easily attached to and detached from a heavy duty transport vehicle to augment the weight or load bearing capability and to conform the vehicle to weight and weight distribution restrictions imposed by various jurisdictions. The dolly improves the handling characteristics and maneuverability of heavy duty transport vehicles, particularly with regard to the cornering capacity and safety. The dolly includes a steering system requiring no elaborate operator controlled or actuated steering linkages, yet the dolly conveniently may be adapted to provide for manual steering. Additionally, the responsiveness of the steering system is selectively variable whereby optimum handling characteristics may be achieved relative to the type of road surface upon which the vehicle is being operated.

Further objects, features and advantages of the present invention will be understood with reference to the following specification and to the appended drawings and claims.

DESCRIPTION OF THE PREFERRED EMBODIMENT

Figure 1:
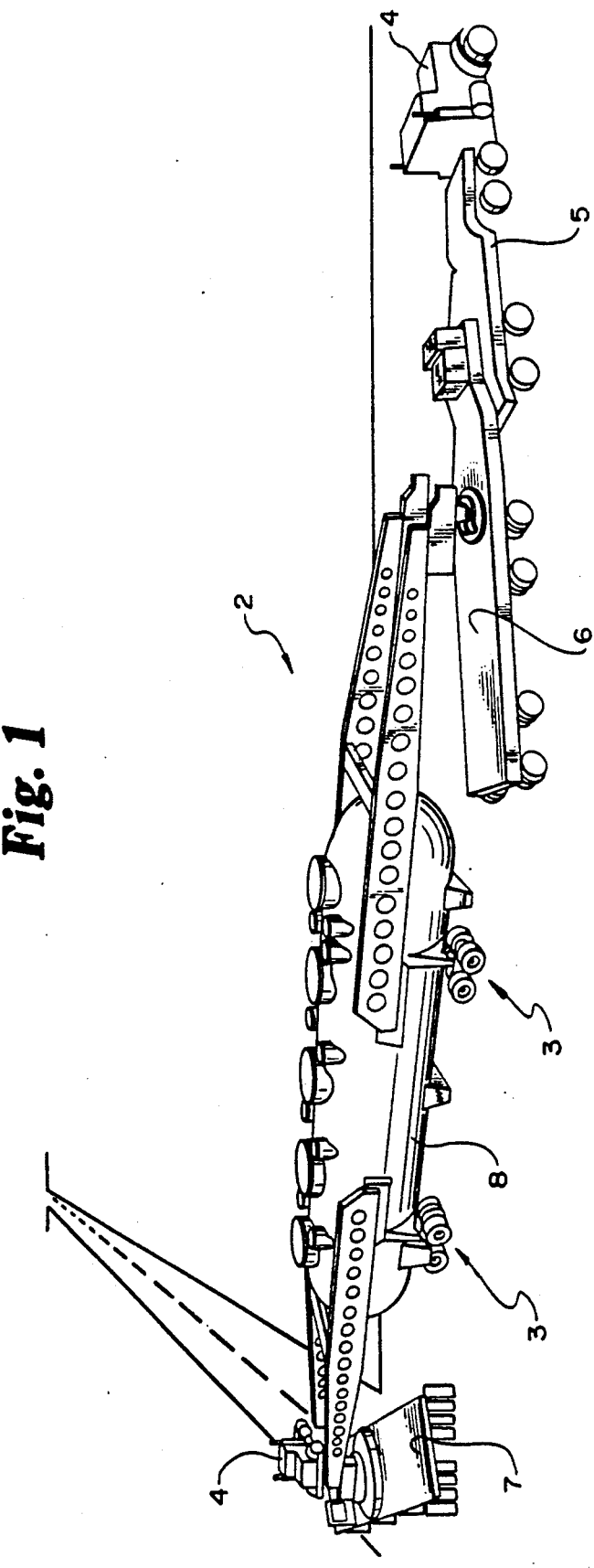
FIG. 1 is a pictorial depiction of a vehicle including the dolly of the present invention.

FIG. 1 shows a pictorial depiction of a vehicle 2 with which the dolly 3 of the present invention may be used. The vehicle 2 is made up of two tractors 4, a front jeep 5, a front carriage 6 and a rear carriage 7. A load 8 is suspended between the front and rear carriages and a pair of dollies 3 are attached to the load 8. The vehicle 2 may reach an overall length of approximately 260 feet and may have a gross weight of approximately 700,000 pounds.

Figure 2:
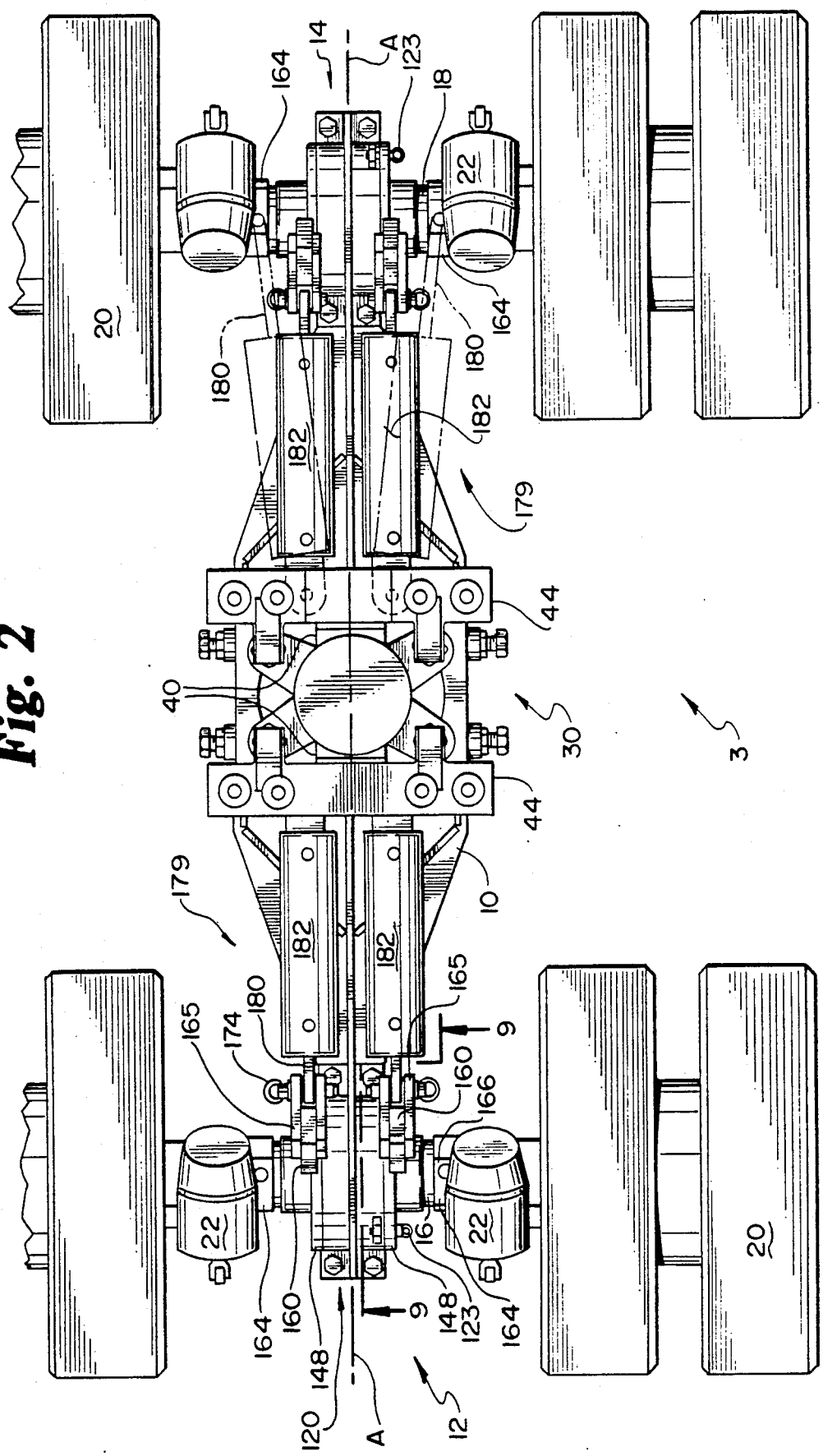
FIG. 2 is a top plan view of the dolly of the present invention.

References to structure, positions and orientations of components of the dolly 3 will be undertaken with reference to the longitudinal central axis of the dolly as shown by line A in FIG. 2. References to transverse and upper and lower locations relative to the dolly 3 will be made with reference to this center axis or line.

FIG. 2 shows that the dolly 3 includes a chassis 10 having a front end 12 and a rear end 14. The chassis 10 comprises a rigid body that may be made of suitable material such as plate steel. There are two axles, a front axle 16 and a rear axle 18, attached to the chassis 10. A plurality of wheels 20 are mounted on the axles and the axles 16, 18 also support a plurality of brake cylinders 22. Axles 16 and 18, and their respective axle housings and bearing assemblies are aligned orthogonal to the longitudinal axis A.

Figure 3:
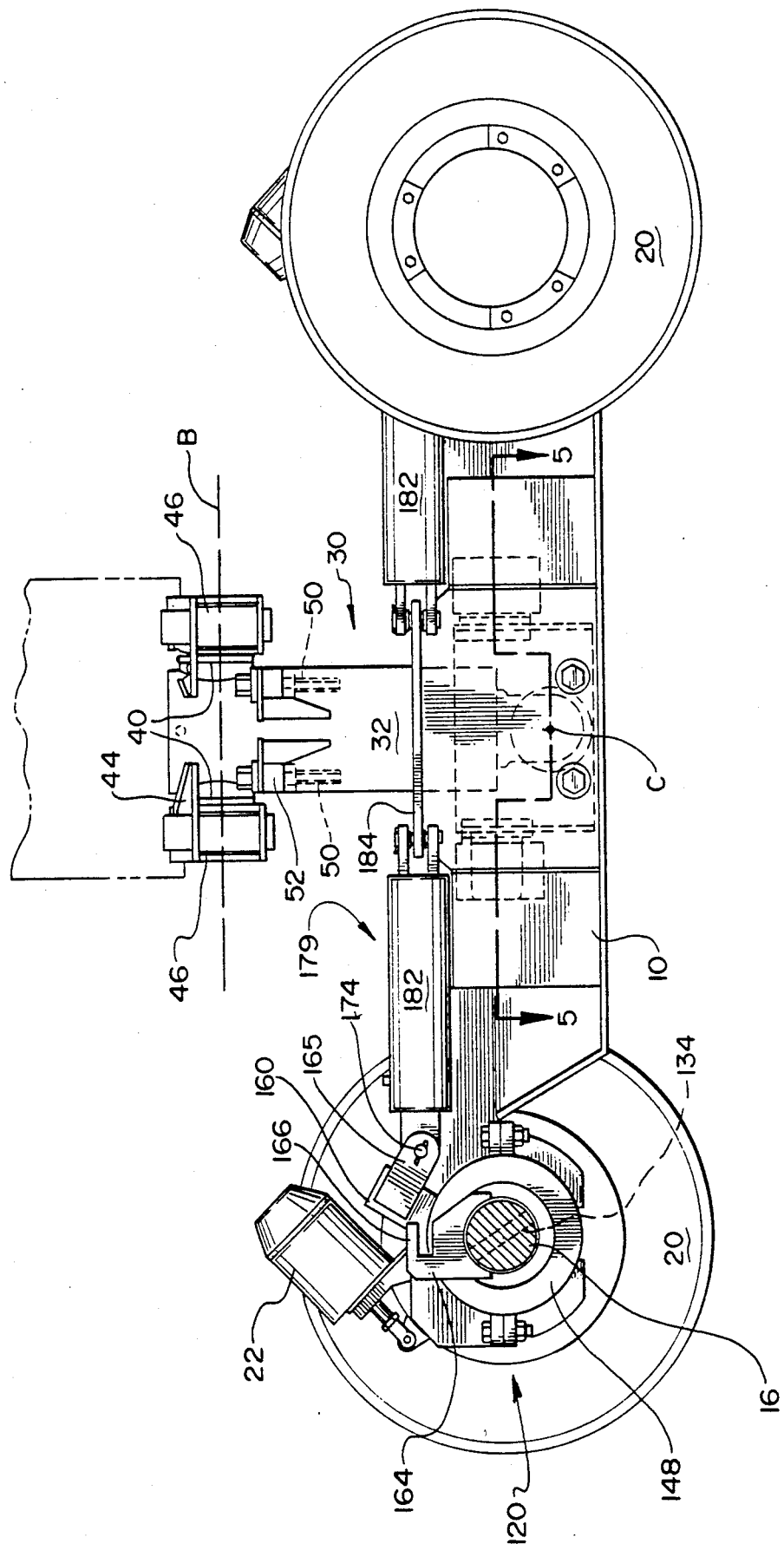
FIG. 3 is a side elevational view of the dolly.

Referring to FIGS. 2 and 3, the dolly 3 has a central load column 30, which includes a cylinder 32 having an upper end and a lower end. Near the upper end of the cylinder 32, a pair of pivot shafts 40, including a front shaft and a rear shaft, are provided. The shafts 40 may be attached to the cylinder 32 by appropriate means such as welding and extend diametrically and generally perpendicularly therefrom in alignment along axis B, which is parallel with the dolly's longitudinal axis (line A, FIG. 2).

The shafts 40 are received by front and rear journals 46 in a pivot weldment plate 44, which may be directly attached to the load. Just downwardly from and beneath the cylinder upper end, a plurality of jack screws 50 are received in jack screw housings 52 which are affixed to the cylinder 32. A nitrogen-accumulator suspension unit (not shown) may be provided at or near the plate 44 or the upper end of the cylinder 32. As will be explained more fully herein below, the shafts 40 and journals 46 arrangement provides an upper load-leveling pivot about an axis represented by line B.

The wheel and axle assemblies mounted to the front end 12 of chassis 10 are identical to the wheel and axle assemblies mounted to the rear end 14 of chassis 10. Reference herein will be made specifically to the wheel and axle assembly mounted to front end 12 of chassis 10, it being understood that the construction of the rear wheel and axle assembly is identical. The wheel and axle assembly is attached to chassis 10 by means of a central housing 120, wherein axle 16 passes through housing 120. The particular construction which forms this attachment will be described in more detail hereinafter. A pair of rotatable flanges 148 extend outwardly of housing 120, and each flange 148 has affixed thereto a lever arm 160 and yoke 165. The rotatable flanges 148 control the relative angular position of a king-pin, to be hereinafter described, and the rotational position of the flanges 148 is controlled by a hydraulic system 179. Hydraulic system 179 includes a pair of cylinders 182 pivotally attached to journals 44. Each cylinder 182 has an extensible rod 180 which may be pinned to a yoke 165 by means of removable pins 174. Alternatively, cylinders 182 may be pivoted outwardly as is illustrated in the rear axle assembly shown in FIG. 2, and the extensible rods 180 may be pinned to a steering anchor 164. Each rod 180 must, of course, be turned 90° about its axis in order to change its pinned location between a yoke 165 and a steering anchor 164. Each steering anchor 164 is affixed to an axle. Each of the rods 180 are connected to a piston inside cylinder 182, and are therefore extensible and retractable in accordance with the interior movement of the piston. Hydraulic assembly 179 functions to accommodate manual steering of the dolly 32 when rods 180 are pinned to steering anchors 164, and to control the castor of a king-pin when the rods 180 are pinned to yokes 165. This function will be more fully explained hereinafter.

Figure 4:
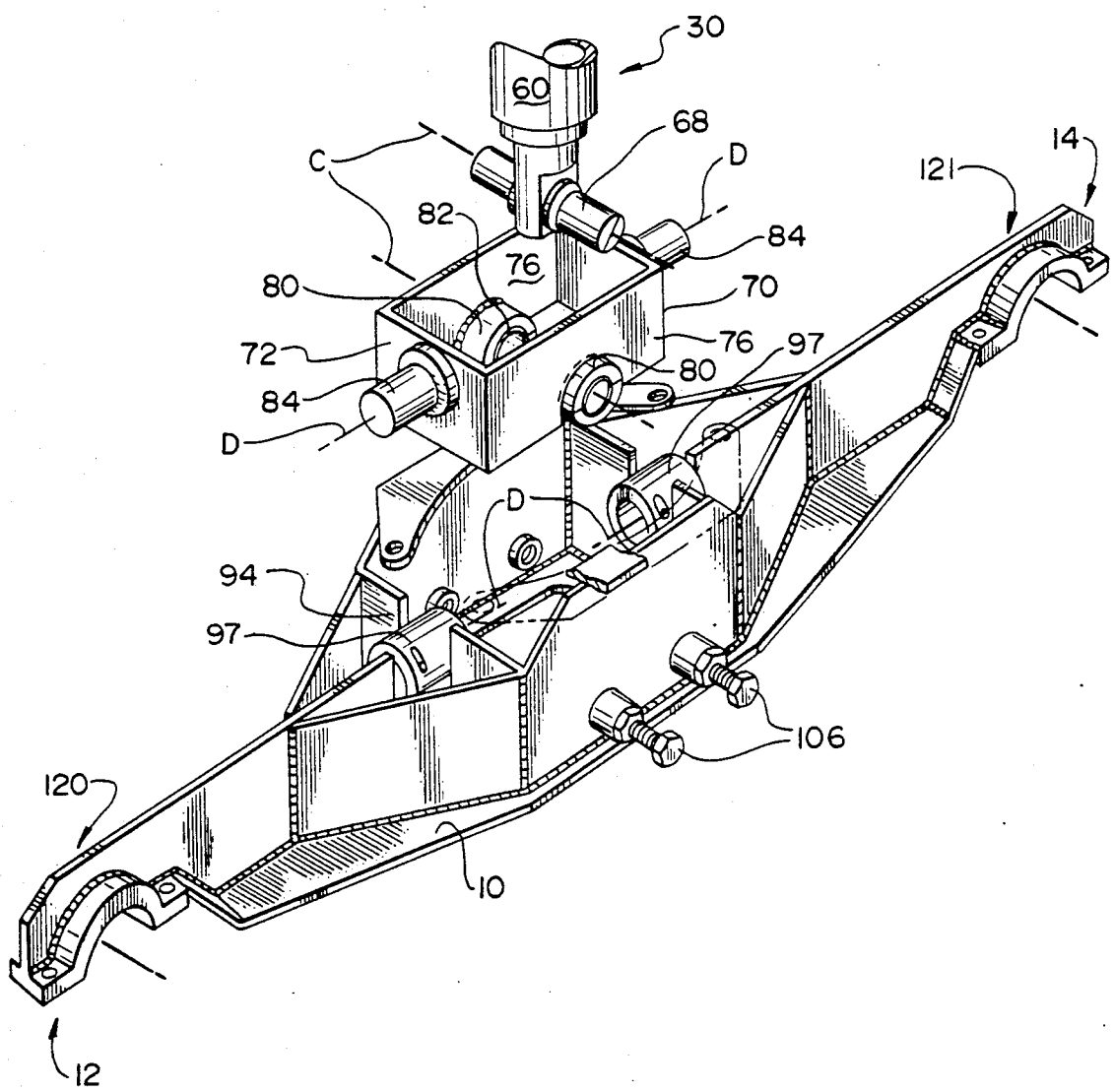
FIG. 4 is a fragmentary, exploded perspective view of the generally central portion of the dolly and the central equalizing pivot bracket therein.

FIG. 4 is an exploded perspective view showing a portion of the dolly 3, particularly the lower end of the central load column 30, and how it is connected to the chassis 10. The lower end of a piston 60 that is reciprocally received in the cylinder 32 can be seen. Piston 60 is rotatable within the cylinder 32, which permits relative rotation to occur between the load and the dolly during turning operations. This rotation occurs about the axis of the piston and cylinder, which is always substantially vertical. An aperture is provided at or near the lower end of the piston 60 for receiving an equalizing shaft 68. FIG. 4 also shows that the chassis 10 is provided with an equalizing pivot housing 70. The housing 70 has end walls 72 and side walls 76. Transverse journals 80 are integrated within the housing 70. The journals 80 receive the ends of the equalizing shaft 68 and each journal 80 is provided with an anti-friction bearing 82 so that the shaft 68 may be freely rotated therein. The equalizing pivot housing 70 is provided with longitudinal shafts 84 welded thereto and extending from the bracket 70 in general parallel alignment with the central longitudinal axis (line A, FIG. 2) of the dolly 3. Shaft 68 and journals 80 are orthogonal to shafts 84 and journals 97; i.e., axis C is orthogonal to axis D.

Further reference to FIG. 4 shows that the chassis 10 has an internal frame 94 supporting journal halves which form a pair of split journals 97. The journals 97 are generally aligned along an axis D, in parallel with the central longitudinal axis (line A, FIG. 2) of the dolly 3. Each journal 97 receives a longitudinal shaft 84. The chassis 10 is provided with a plurality of release screws 106, two on each side of the dolly's central longitudinal axis.

Figure 5:
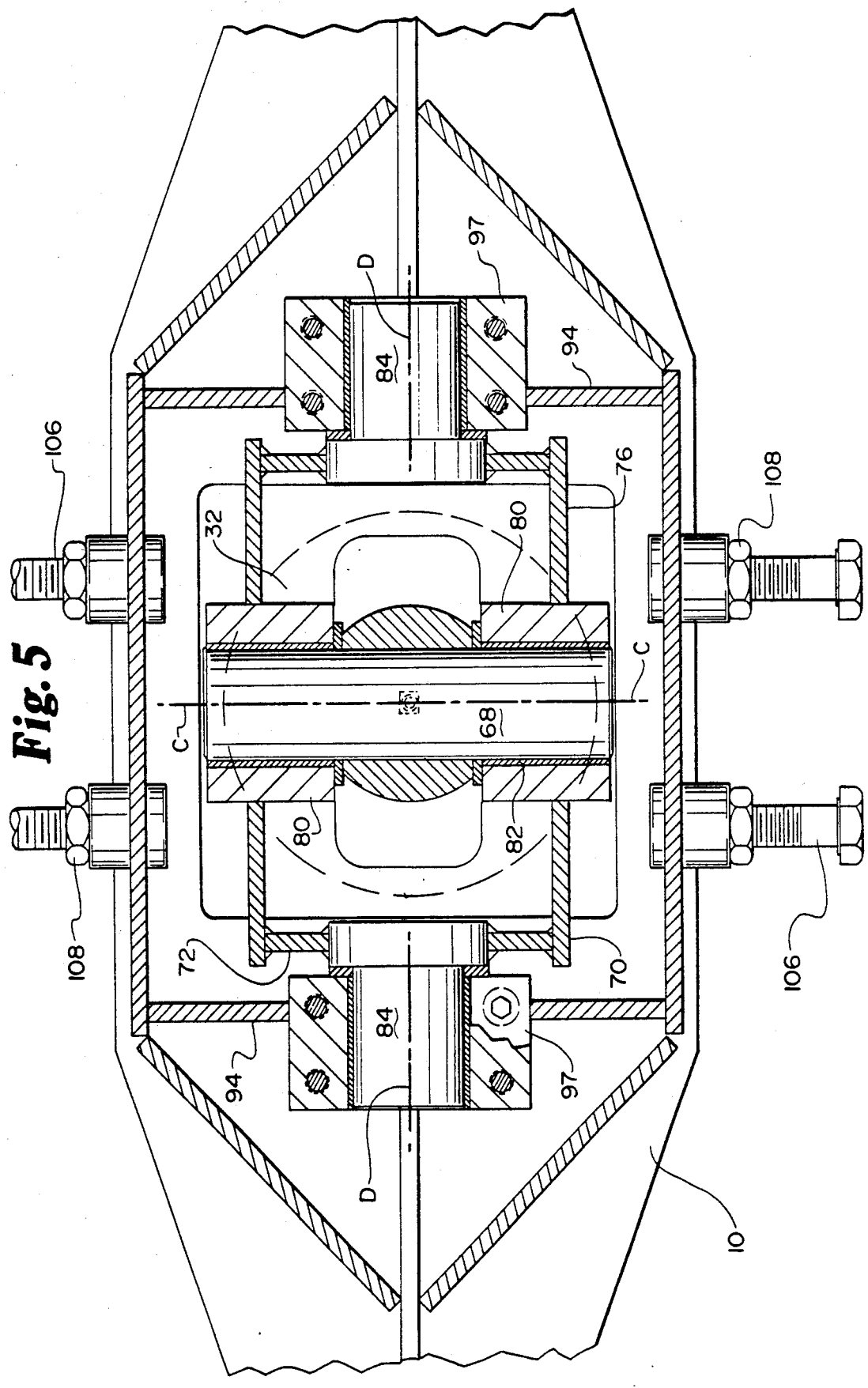
FIG. 5 is a partial cross-sectional view of the central equalizing pivot bracket of the present invention along lines 5—5 of FIG. 3.

FIG. 5 is a cross-sectional view taken along line 5—5 in FIG. 3 and shows additional details of the lower end of the central load column 30 and how it is connected to the chassis 10. Specifically, axis C represents the axis of motion about the equalizing pivot provided by the equalizing shaft 68 and transverse journals 80. The pivoting motion about axis C provides for longitudinal ground-irregularity, permitting compensating vertical motion of the wheels 20 and axles 16, 18 at the front and rear of the dolly 3. Axis D represents the axis of longitudinal shafts 84 and journals 97. The pivotal motion about axis D compensates for transverse ground-irregularity and permits relative movement of the load supported by the dolly 3.

Figure 6:
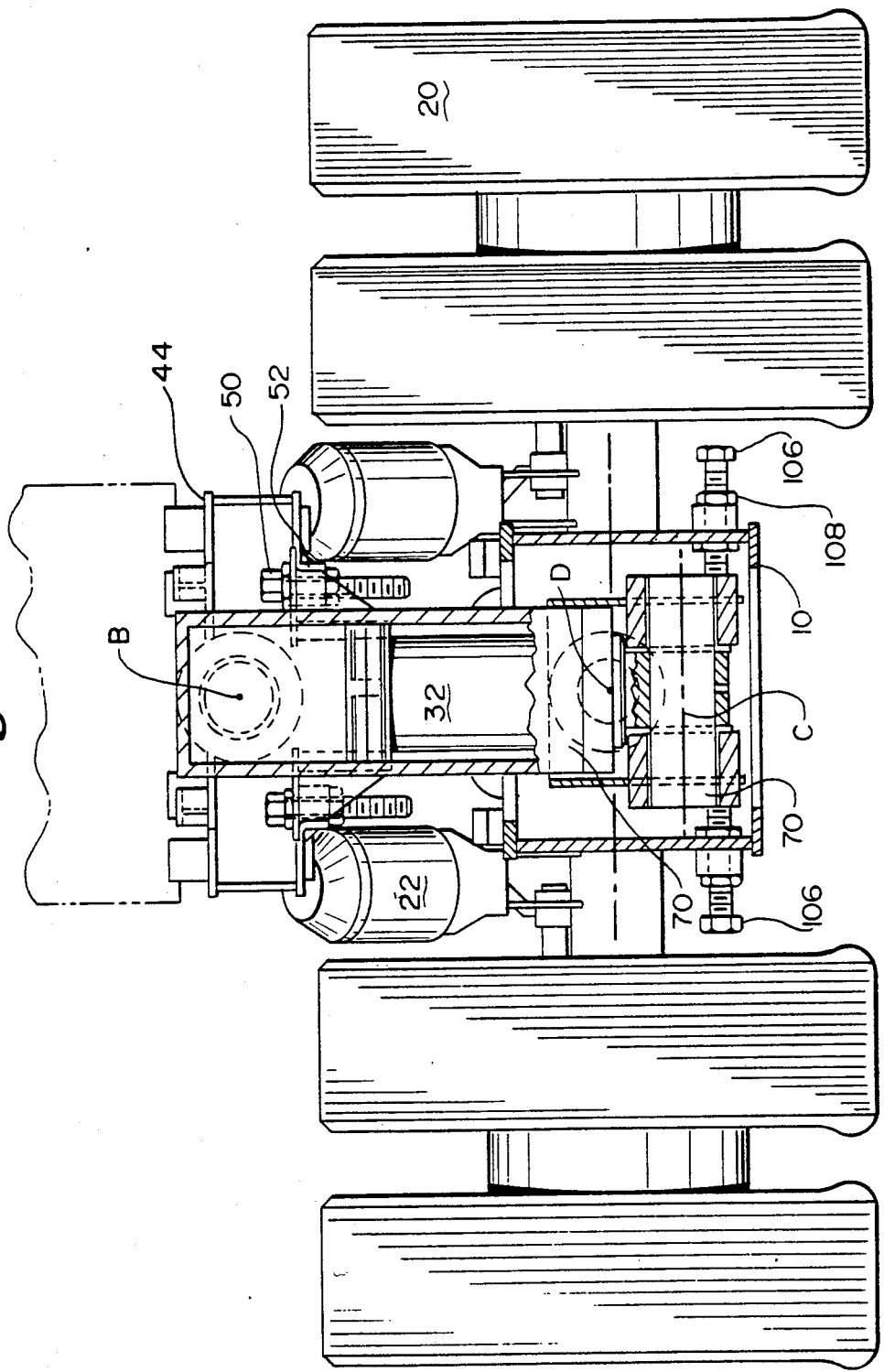
FIG. 6 is a partially sectioned front elevation view.
Figure 7:
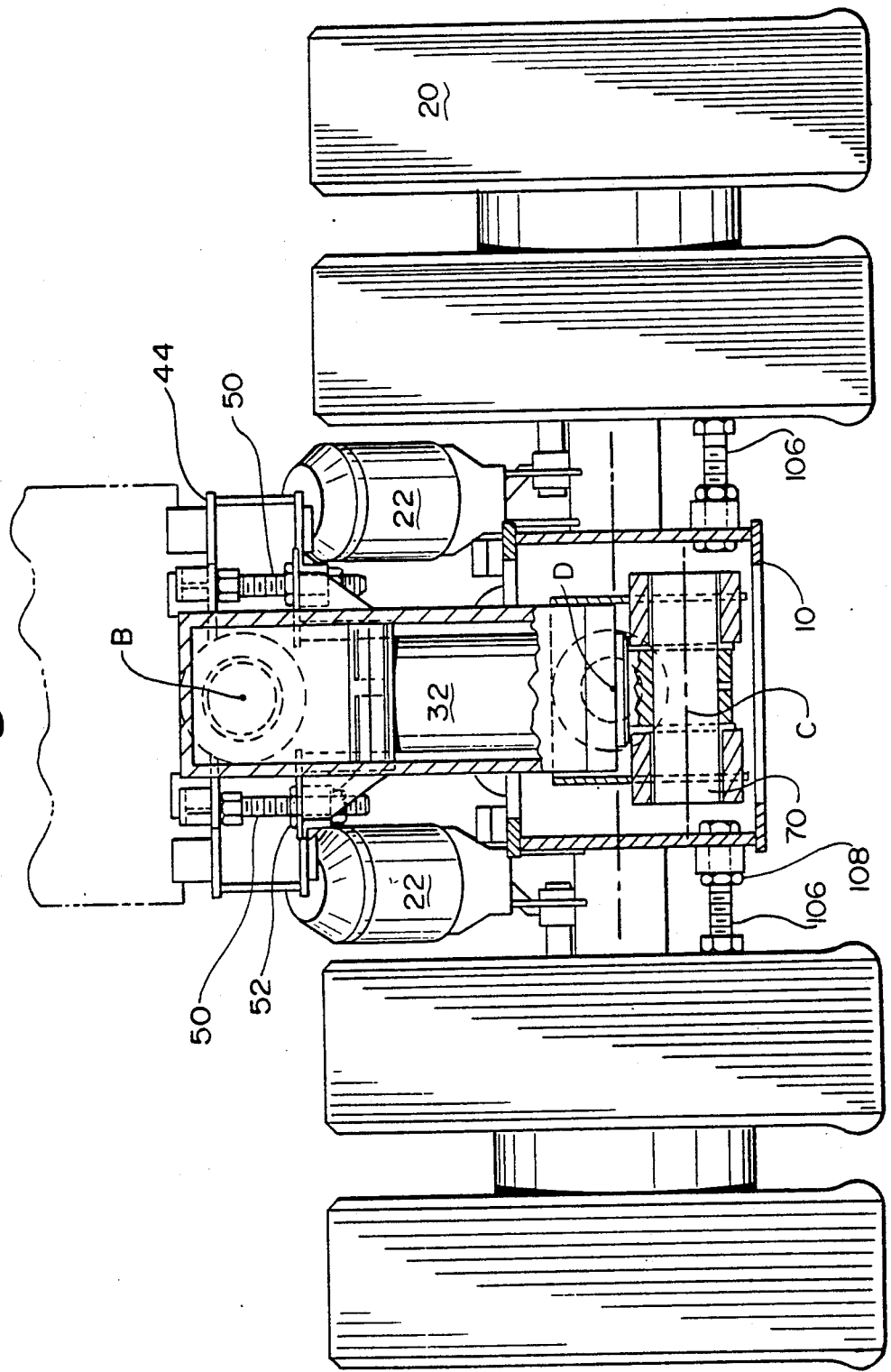
FIG. 7 is a partially sectioned further front elevation view.

Although the function of the release screws 106 will be explained more fully herein below, FIGS. 6 and 7 show that the release screws 106 may be turned inwardly (FIG. 6) and outwardly (FIG. 7) relative to the dolly's central axis (line A, FIG. 2) and to the equalizing pivot housing 70. Jam or lock nuts 108 are provided to hold the release screws 106 in their selected position.

Figure 8:
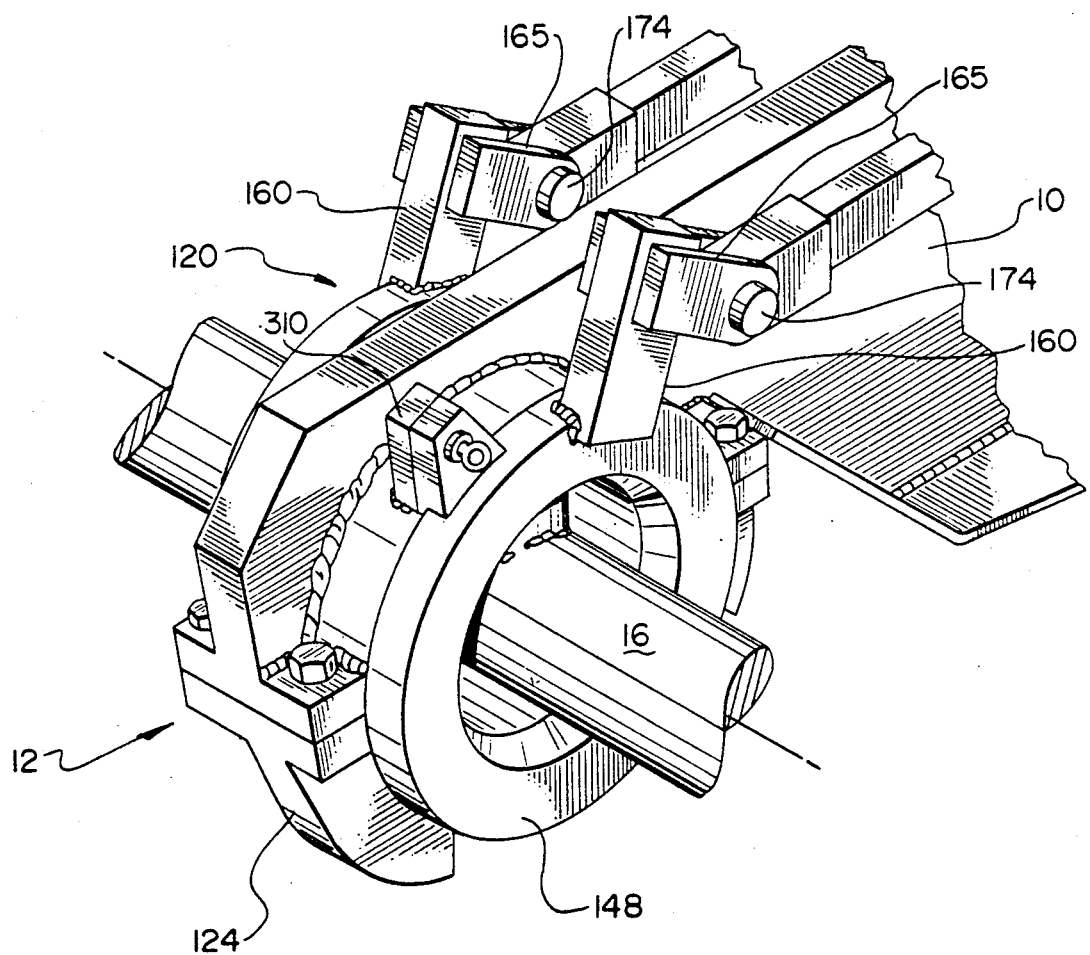
FIG. 8 is a perspective view of the steering assembly housing.

FIG. 8 shows that front end 12 of the chassis 10 terminates in a central, generally cylindrical housing 120. Rear end 14 also terminates in a similar housing 121. The front and rear axles 16, 18 are attached to the chassis 10 so that the central housings 120, 121 are located generally at the midpoint of each axle 16,18. The central housing 120 and 121 each contain a steering hub assembly which is secured in the housing by the clamp 124; the clamp 124 may be held to the housing by a plurality of bolts.

The central housing 120 at the front end 12 and central housing 121 at the rear end 14 of the chassis 10 are essentially mirror images of one another, being formed of substantially similar components oriented substantially similarly relative to each other. For this reason, only the central housing 120 and the steering hub assembly therein is described.

Figure 9:
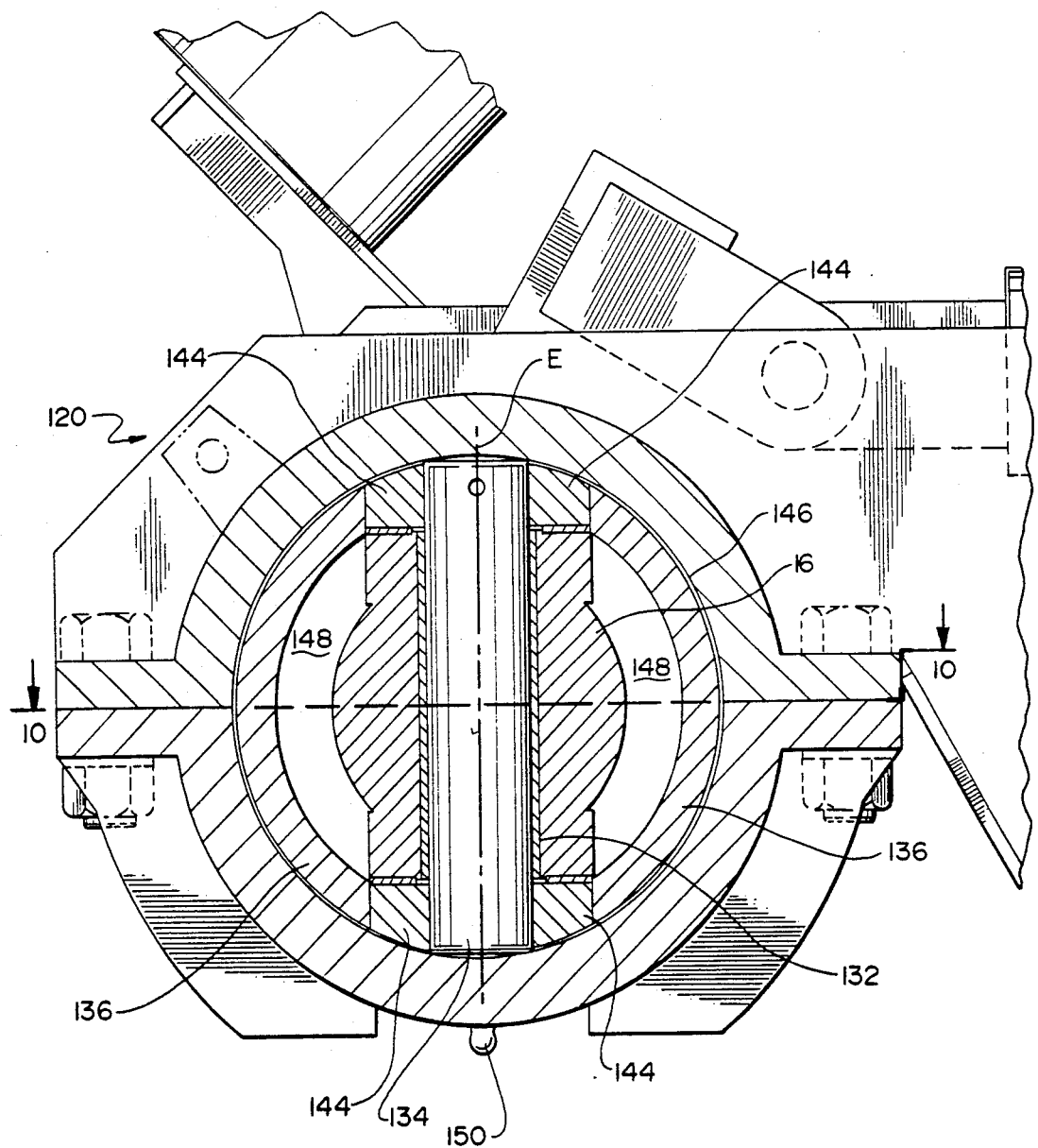
FIG. 9 is a partial cross-sectional view of a king-pin and the mounting therefor taken along line 9—9 in FIG. 2.
Figure 10:
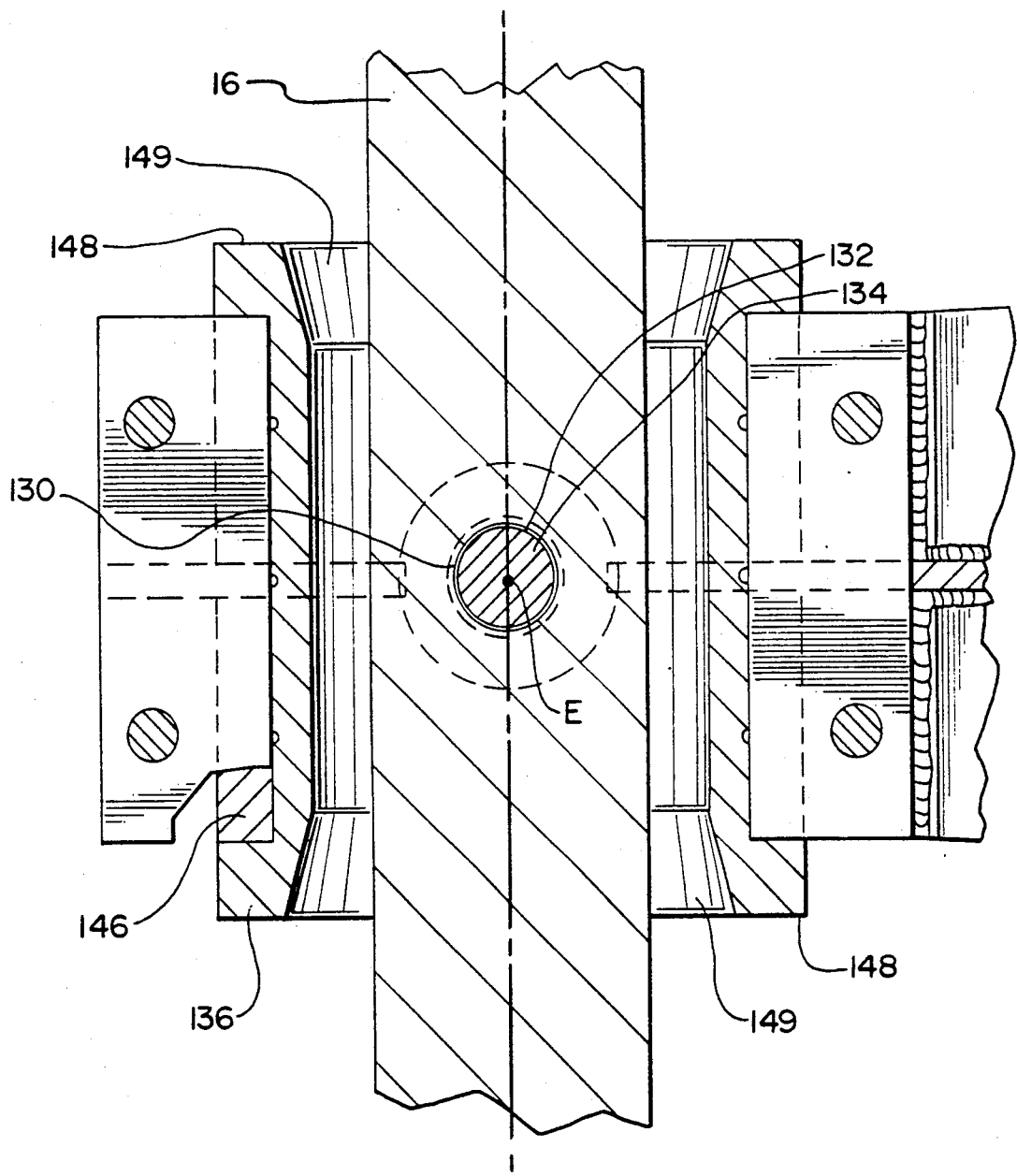
FIG. 10 is a partial cross-sectional view of a king-pin and the mounting therefor taken along line 10—10 in FIG. 9.

With particular reference to FIGS. 8 through 10, it can be seen that the front axle 16 is generally solid, rigid and is provided with a diametric bore 130. The bore 130 is a straight through-bore located generally medially in the axle 16, through raised shoulders 131. The bore 130 may be lined by anti-friction bearings 132, which are provided because the bore 130 receives a king-pin 134, and the king-pin 134 must be able to rotate freely therein.

Figure 11:
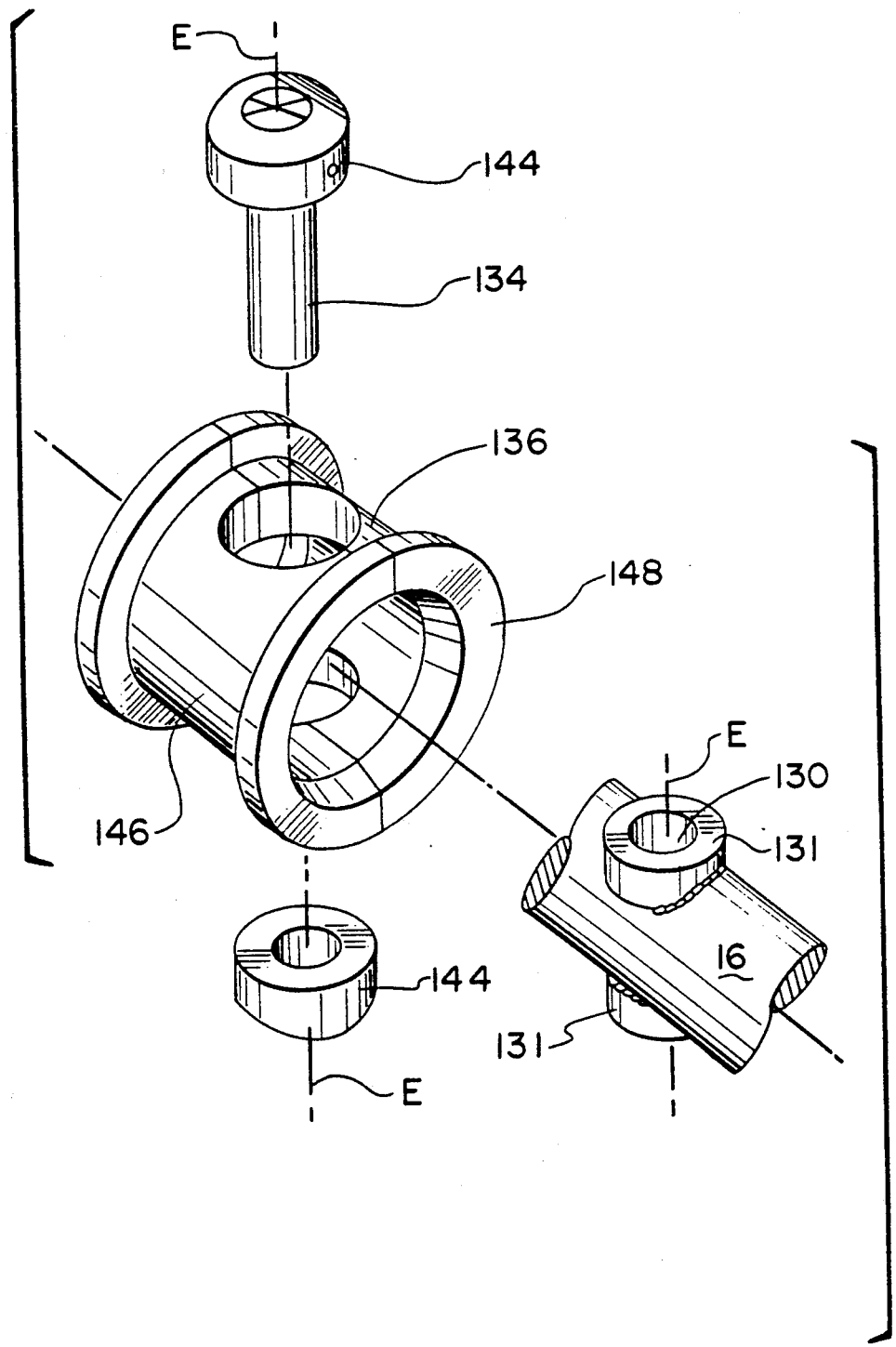
FIG. 11 is a fragmentary, exploded perspective view of selected parts of a king-pin and the mounting therefor.

FIG. 11 is an exploded perspective showing the king-pin 134, a split-collar 136, and how the king-pin 134 is received in the split-collar 136 and the axle 16. The axle 16 is rotatably attached to the chassis 10 in the central housing 120 by the split-collar 136 and is pivotally attached to split collar 136 by king-pin 134. The split-collar 136 has an outer surface 146 which forms a bearing surface against the inside surface of housing 120, and has a pair of end flanges 148 which extend outwardly beyond housing 120. The split-collar 136 formed thereby is a generally cylindrical collar having an inner bearing 132 sized to approximately correspond to the outer diameter of axle 16.

The thrust bearings 144 shown in FIGS. 9 and 11 are provided to handle the forces generated along the axis E by axle 16, and form a thrust bearing surface against the outer surface of raised shoulders 131. The outer surface 146 of the split-collar 136 provides a generally cylindrical bearing surface for rotational movement in the housing 120. The inside surface 149 of flange 148 is tapered outwardly to permit a range of pivotal motion between the axle 16 and housing 120, about the central longitudinal axis E of the king-pin 134. A grease fitting 150 is provided for lubrication.

Each flange 148 has a lever arm 160 affixed by weldments, and each lever arm 160 has a yoke 165 attached thereto. The yokes 165 may be attached to the lever arms 160 by appropriate means including welding. The yokes 165 each comprise parallel members having axially aligned apertures therethrough, for receiving pins 174.

The above recited structure accomplishes objects and provides significant advantages. It achieves the important objective of distributing loading. It provides a heretofore unavailable degree of sensitivity and response to the conditions of the highway, the amount of weight being transported, and the speed of transportation. It provides a load supporting, self-steerable or manually steerable dolly 3 that improves the efficiency and safety with which heavy to massive loads may be transported.

For understanding how the above-identified structural components provide these advantages and how the various components of the dolly 3 may be manipulated to provide optimum handling characteristics, a discussion of use, structural interrelationships and operational and performance characteristics follows.

The general purpose of any steering system is to enable a vehicle to change direction of travel and to negotiate corners. With extremely long vehicles, such as the type represented in FIG. 1 wherein dollies 3 might be used, negotiation of corners is difficult, particularly when a typical, load-supporting dolly or dummy wheel/axle arrangement (not shown) is being used with the vehicle; a non-steerable dolly would tend to skid through the corner or be forced out from under a load. In addition to accomplishing the general objective of any steering system, that of cornering, the dolly 3 of the present invention is a self-steering dolly which minimizes skidding and simplifies cornering without requiring operator control or steering of the dolly 3.

Figure 12:
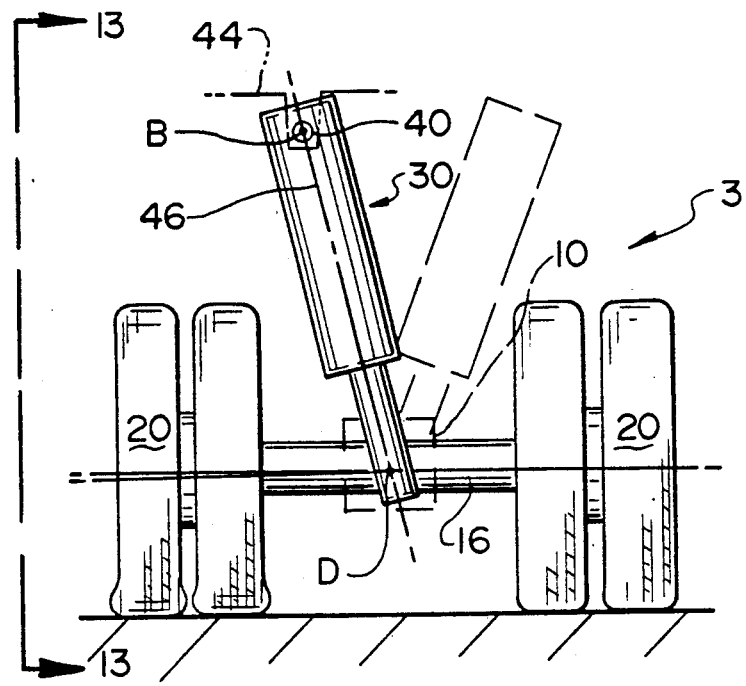
FIG. 12 is a schematic representation of the central load column showing its leaning movement with the bottom oscillation pivot locked out and in response to loading on the dolly.
Figure 13:
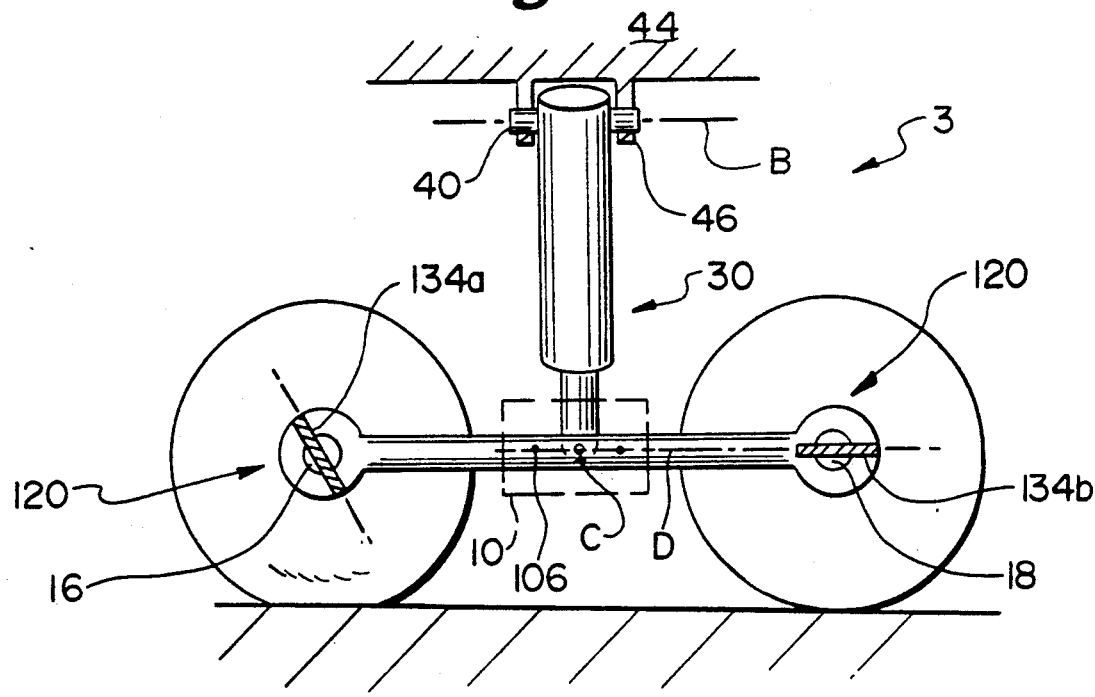
FIG. 13 is a schematic representation, taken along line 13—13 in FIG. 12, of the steering effect when the cylinder leans as shown in FIG. 12.

FIGS. 12 and 13 show in simplified schematic form the physical relationships of the dolly 3 structure and how that structure generates or provides this self-steer capability. Specifically, the load may be directly attached to or supported by the pivot weldment plate 44. The plate 44 and the load thereon will be carried by the dolly 3 in a level state with respect to the ground as a result of being free to move about line B, the upper, side-to-side load leveling pivot axis formed by journals 46 and shaft 40.

The central load column 30 communicates the sideways movement of the load generated during the movement of the vehicle 2, particularly during turning, through the chassis 10 to the wheels 20. This load movement is communicated through the central load column 30 and through the pivot point having the central axis represented by axis D. The diagrams of FIGS. 12 and 13 illustrate the effects of turning motions on the central load column 30 in the circumstance wherein the release grooves 106 are turned outwardly away from contact with the sidewalls 76 of the equalizing pivot housing 70. In this circumstance, FIG. 12 illustrates the effects of a left turn, in solid lines, and the effects of a right turn in dotted outline, wherein central load column 30 pivots about axis D in either event. A left turn tends to place increased loading upon the left wheels 20, as pictorially illustrated in FIG. 12.

The pivotal movement of load column 30 about axis D may be eliminated by adjusting release screws 106 inwardly until they contact the sidewalls 76 of the equalizing pivot housing 70. In this circumstance, load column 30 is constrained along a line normal to axis 16, and a turning movement will tend to raise the outbound wheel and push the inbound wheels into the ground. FIG. 13 is a view taken along the lines 13—13 of FIG. 12, illustrating this effect in somewhat exaggerated form, in the circumstance of a left turn as viewed in FIG. 12, with central load column 30 locked into a position normal to axle 16. The forces which are created tend to tip dolly 3, and these forces are communicated via chassis 10 to axles 16 and 18. Axle 16 has a king-pin 134a which is inclined forwardly as illustrated in FIG. 13, and axle 18 has a king-pin 134b which is aligned horizontally. The left turning forces will have no effect on the relative movement of axle 18 about king-pin 134b, but will tend to cause rotation of axle 16 about king-pin 134a. This rotation will result in a pivoting of axle 16 about king-pin 134a, causing axle 16 and wheels 20 to turn in the direction of the leftward turn movement. This causes dolly 3 to move leftward, following the turn, and alleviates the unbalanced forces caused by the left turning movement.

It should be appreciated that the steering sensitivity or steering response of the dolly 3 of the present invention may be selectively varied. This is accomplished by selecting the castor, or the angle from vertical, of the king-pin 134. Although only selected specific angles, 30° and 60°, are discussed herein, but any angle or castor (and therefore, degree of sensitivity) between a horizontal position and a vertical position for king-pin 134 may be selected.

Examining FIGS. 18A-E, Angle A° (FIGS. 18A and E and the following table) is the theoretical deflection of the central load column 30 from vertical under loading conditions resulting from turning forces. Dimension X (FIGS. 18A, B and C and the table) is the theoretical lifting of the axle 16 in response to the deflection of column 30 (assuming that screws 106 are locked inwardly). Angle B° (FIGS. 18C and E and the table) is the selectable angle or castor of the king-pin 134 from vertical. Dimension Y (FIGS. 18C and D and the table) is the calculated steering movement of the axle 16, and Angle C° (FIGS. 18D and E and the table) is the degree of steering or turning of the axle 16 about the king-pin 134 under these conditions.

The selective sensitivity of the self-steer of the dolly 3 can be seen by examining the following table and the results when column 30 theoretically deflects 15° (Angle A°). The resultant self-steer when the king-pin angle (Angle B°) is 30° is a 24.89° (Angle C°) turning of the axle 16. When the king-pin angle (Angle B°) is 60°, the resultant self-steer is an 8.79° (Angle C°,) turning of the axle 16, thus reflecting a less sensitive, diminished response self-steer suitable for relatively higher operating speeds.

The relationships presented in FIGS. 18A through E and the resultant performance characteristics of the dolly may be exemplified in tabular form as follows:

| | | B° = 30° (FIG. 14) | | B° = 60° (FIG. 15) | |
|---|---|---|---|---|---|
| Angle A° | Dim X | Dim Y | Angle C° | Dim Y' | Angle C°' |
| 3 | 1.572 | 2.723 | 5.19 | .908 | 1.70 |
| 6 | 3.153 | 5.461 | 10.32 | 1.820 | 3.47 |
| 9 | 4.752 | 8.231 | 15.34 | 2.744 | 5.23 |
| 12 | 6.377 | 11.045 | 20.21 | 3.682 | 7.00 |
| 15 | 8.038 | 13.920 | 24.89 | 4.641 | 8.79 |
| 18 | 9.248 | 16.884 | 29.37 | 5.682 | 10.62 |
| 21 | 11.516 | 19.946 | 33.62 | 6.649 | 12.5 |

The foregoing table shows that, for increasing turning forces (Angle A° increasing) there is a corresponding increase in the steering angle (Angle C°) of the axle, at any castor angle. The table also shows, for any given turning load condition (Angle A°), an increase in the castor angle (Angle B°) results in a reduced turning angle (Angle C°) of the axle. Thus, control over the castor angle (Angle B°) enables an operator to control the turning sensitivity of dolly 3.

Figure 14:
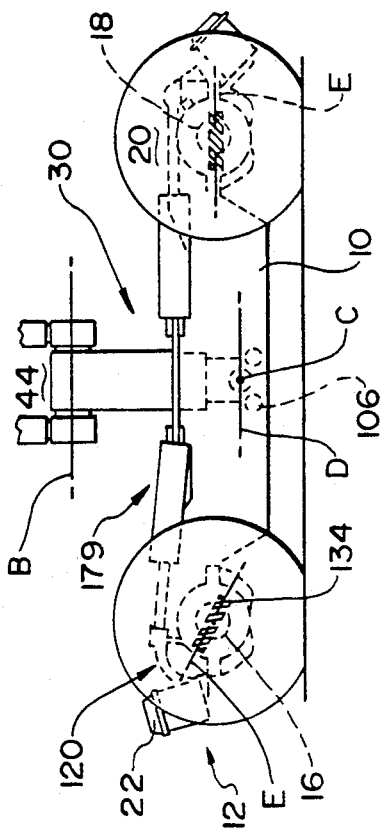
FIG. 14 is a schematic view showing the king-pins of the automatic steering system of the dolly of the present invention in an exemplary position.
Figure 19:
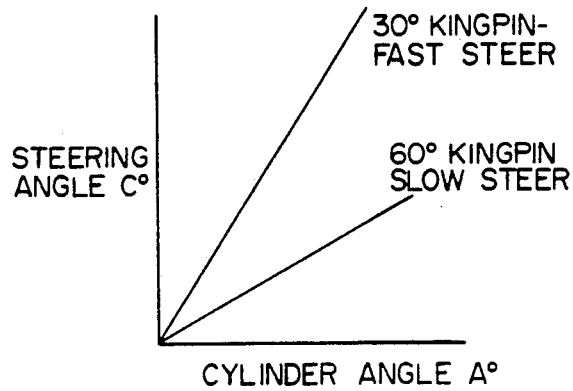
FIG. 19 is a graph presenting the resultant performance from the operational positions of the king pin.

FIG. 14 shows a front king-pin 134 having a castor or inclination from vertical of 30°. FIG. 19 graphically presents the degree of sensitivity generated by the 30° angle. The angle or castor is used with the upper side-to-side load-leveling pivot (axis B) free and the lower pivot (axis D) locked (FIG. 6). To achieve the 30° king-pin angle, the hydraulic steering mechanism is activated to extend rods 180, thereby rotating the flanges 148, including the split collar 136 inside the central housing 120. This rotates the entire steering hub assembly as well as the axle 16. When the desired degree of castor is obtained, the rods 180 may be locked in place by means of a hydraulic valving mechanism (not shown) and/or by supplemental locking pins 123 (FIG. 2). The orientation or castor of the king-pin 134 depicted in FIG. 14 may be used to provide a sensitive self-steering capability for the dolly 3 in a situation where the speeds at which the vehicle is traveling are low relative to typical highway speeds.

Figure 15:
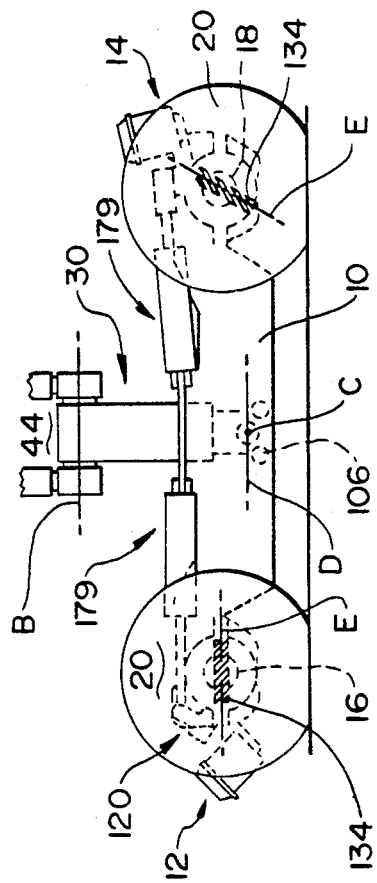
FIG. 15 is a schematic view showing the king-pins of the automatic steering system of the dolly in another exemplary position.

In the arrangement depicted in FIG. 15, the front king-pin 134 angle or castor is 60° from the vertical and provides decreased sensitivity to the movements of the load. The arrangement of the pivots related to the central column 30 and the chassis 10 are the same (FIG. 6). The steering rods 180 have been lengthened further to rotate the steering assembly and the king-pin 134 therein to the 60° angle from the vertical. As shown in FIG. 19 and the table above, a 60° castor of king-pin 134 diminishes the self-steering (Angle C° and C°') in response to the movement of the load supported by the dolly 3. The depicted 60° castor may be suitable for relatively high speed on-highway use wherein a smoother, less active steering response is desirable.

Figure 16:
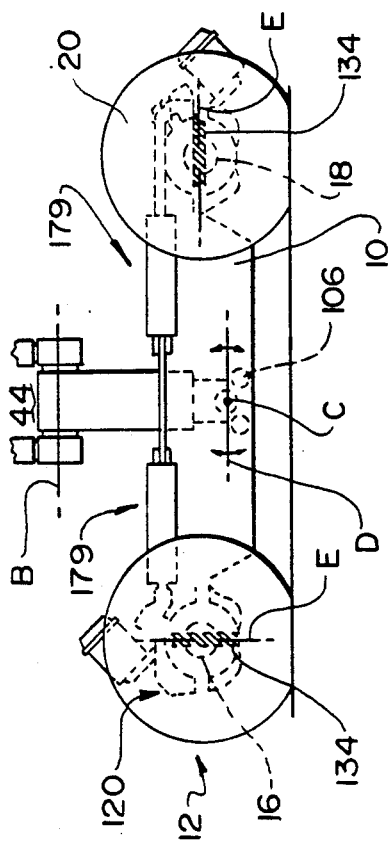
FIG. 16 is a schematic view showing the king-pins of the automatic steering system in another exemplary position.
Figure 18A:
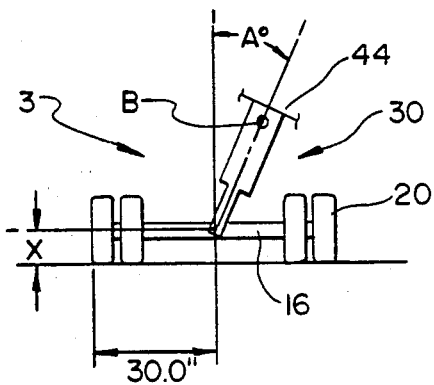
FIGS. 18A-E are diagrams showing the physical relationship of the operational movements and resultant performance of the dolly of the present invention.
Figure 18B:
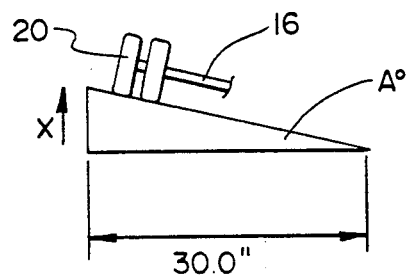
Figure 18C:
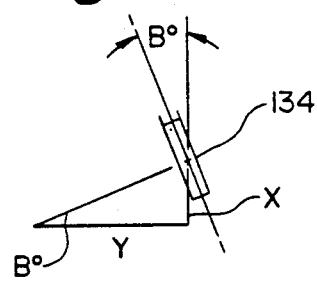
Figure 18D:
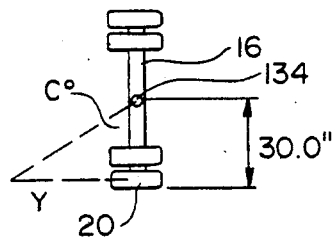
Figure 18E:
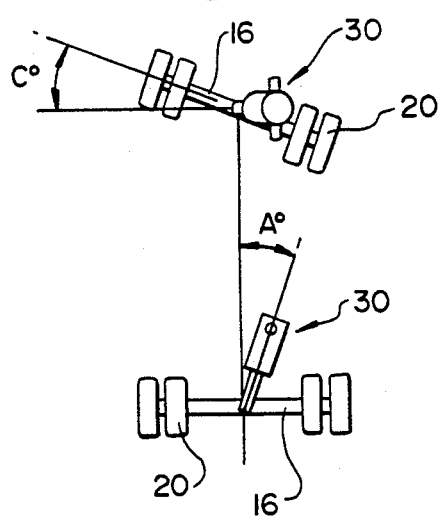

FIG. 16 shows yet another orientation of the king-pins 134 which may be achieved in the dolly 3 of the present invention. The pivots at the central load column 30 again are in the same state (FIG. 6). When the angle of the king-pin 134 is horizontal as shown at the front axle 16 in FIG. 16, it should be appreciated that the axle 16 and the wheels 20 mounted thereon are free to pivot vertically up and down about the king-pin axis E. As might be expected, with the king-pin 134 at axle 16 in a horizontal position the dolly 3 has no self-steering capacity. Notice that in FIG. 16, the king-pin 134 at the rear axle 18 is shown angled from the vertical to provide self-steering if or while the vehicle 2 is traveling in the reverse direction.

Figure 17:
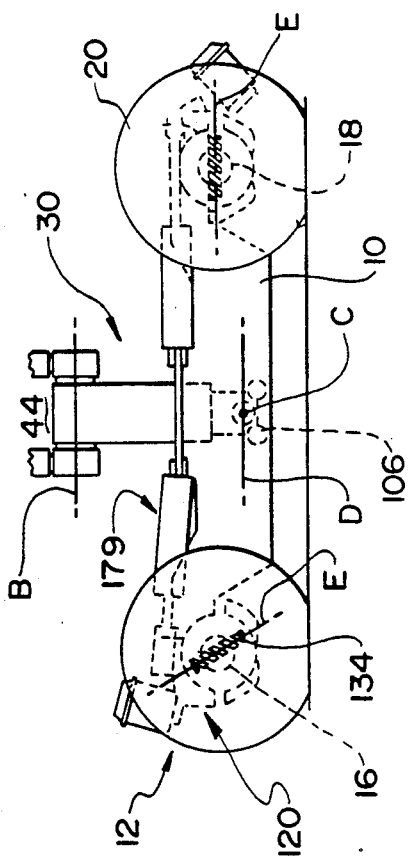
FIG. 17 is a schematic view showing the king-pins of the automatic steering system of the dolly in another exemplary position.

FIG. 17 depicts another structural relationship and performance characteristic that may be produced by the dolly 3. The depicted structural relationship will provide for the situation wherein it is desired to manually steer the dolly 3. Specifically, king-pin 134 at the front axle 16 is vertical or has 0° of castor. The steering rods 180 have been removed from the yokes 165 by simply removing pins 174, and the steering rods 180 have been connected to the steering anchors 164 as shown in phantom in FIG. 2. The king-pin 134 and the steering assembly at the front axle 16 has been locked into the 0° of castor position shown in FIG. 17 by means of the locking pins 123 (FIG. 2). It should be appreciated that the hydraulic system 179 can be activated to control the rods 180 in this position as well, and thus they may be selectively lengthened or shortened relative to one another, causing the axle 16 and the wheels 20 mounted thereon to pivot about the axis E of the king-pin 134 in the desired direction. This will provide a manual steering capability.

In the structural configuration depicted in FIG. 17, with the king-pin 134 at 0° of castor, all vertical motion about the front king-pin 134 will be precluded. Consequently it is necessary to provide vertical motion capability for the front axle 16 at another point. This is done by loosening or turning release screws 106 outwardly, freeing the chassis 10 to turn about the shafts 84 and axis D (FIG. 7). In this operational alignment, the upper pivot (axis B) associated with the load column 30 must be fixed so that the load column 30 will continue to remain upright and support the load. To accomplish this, the jack screws 50 are turned to elevate them above the jack screw housings 52 until they contact the load or pivot weldment plate 44, thereby preventing pivotal motion about axis B (FIG. 7). In this manner, instead of having the forces generated by the movement of the load transmitted to the front king-pin 134, such forces are compensated for by the two orthogonal pivots along axis C and axis D at the base of the load bearing column 30. As FIG. 17 shows, the king-pin 134 at the rear axle 18 may remain in its horizontal or 90° castor orientation to permit the vertical motion of the rear wheels. Thus, the dolly 3 may be manually steered, yet remain responsive to ground or roadway irregularities.

It should be appreciated that with a few simple adjustments, the dolly 3 of the present invention provides supplemental support, minimized point loading and may be operated in an operator-controlled steering capacity or in an automatic self-steering capacity depending upon the desired performance parameters and the situations in which the vehicle 2 is operated. Additionally, it is possible to vary the self-steering sensitivity and maintain the selected sensitivity efficiently and safely.

Figure 20:
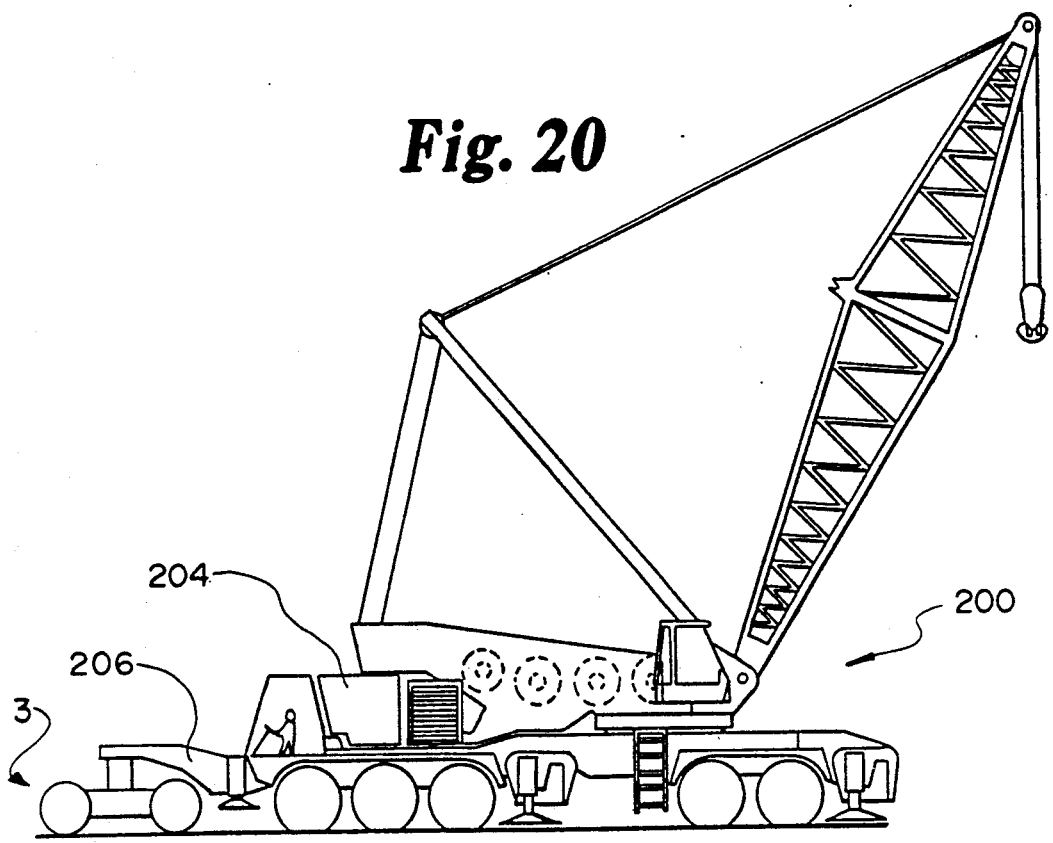
FIG. 20 is a largely schematic depiction of a vehicle including the dolly of the present invention.

FIG. 20 shows how the dolly 3 of the present invention may be used with another type of vehicle for transporting very heavy or massive loads, in this instance a truck crane 200 having a very heavy counterweight 204. The dolly 3 is connected to the crane 200 by a rigid beam 206; a portion of the load of the counterweight 204 is transferred to the dolly 3 through the beam 206.

Figure 21:
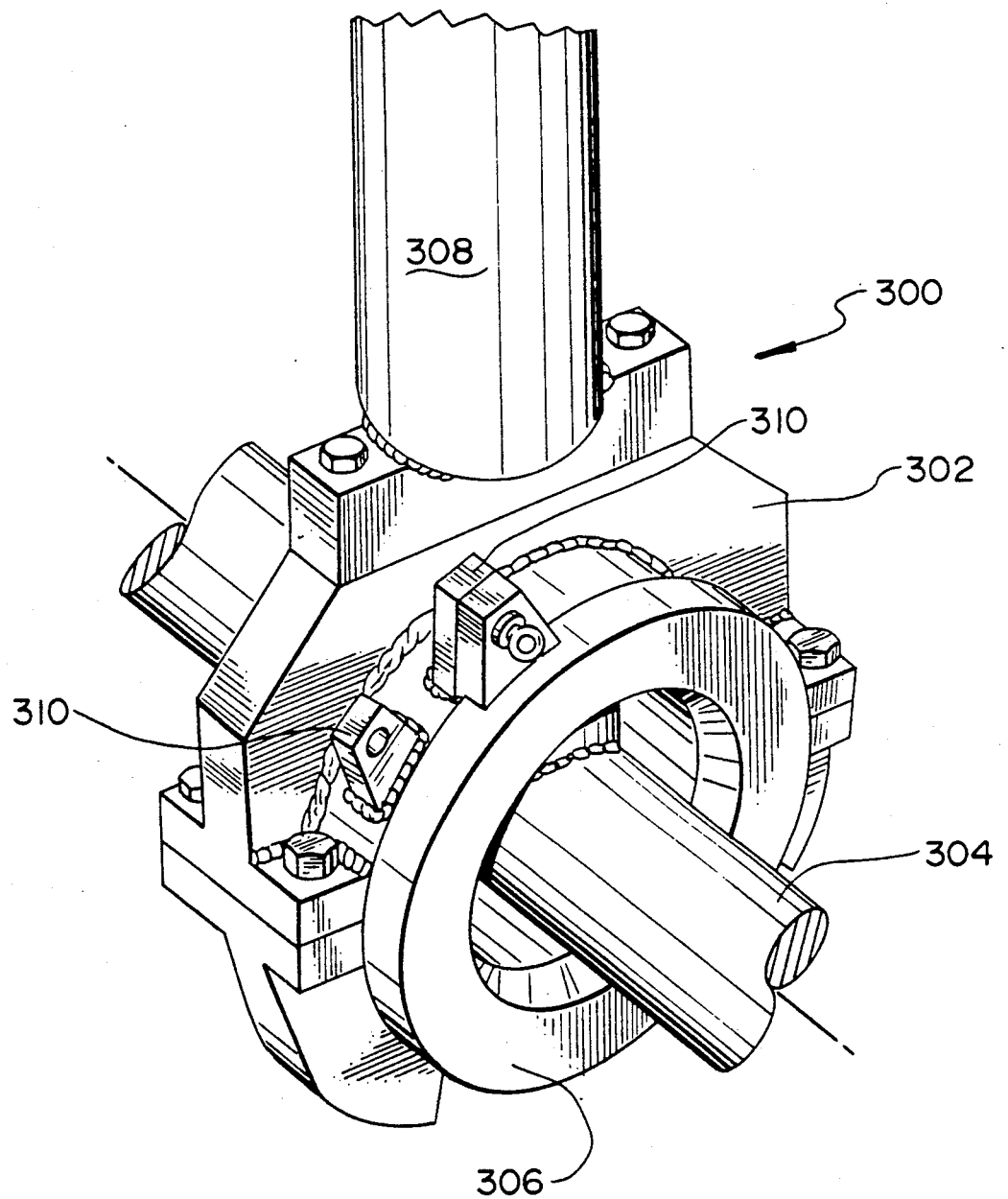
FIG. 21 is a perspective view of a portion of a modified form of the dolly of the present invention.

The dolly 300 partially shown in FIG. 21 is a modified form of the dolly 3 of the present invention. Specifically, the dolly 300 has a chassis 302 and a single axle 304 connected thereto by means of a split-collar 306 and king-pin (not shown). The lower end of a cylinder 308, forming part of a load column, is integrated with or attached directly to the chassis 302 by suitable means such as welding and/or bolting. At least two locking blocks 310 are provided on the chassis 302.

Figure 22:
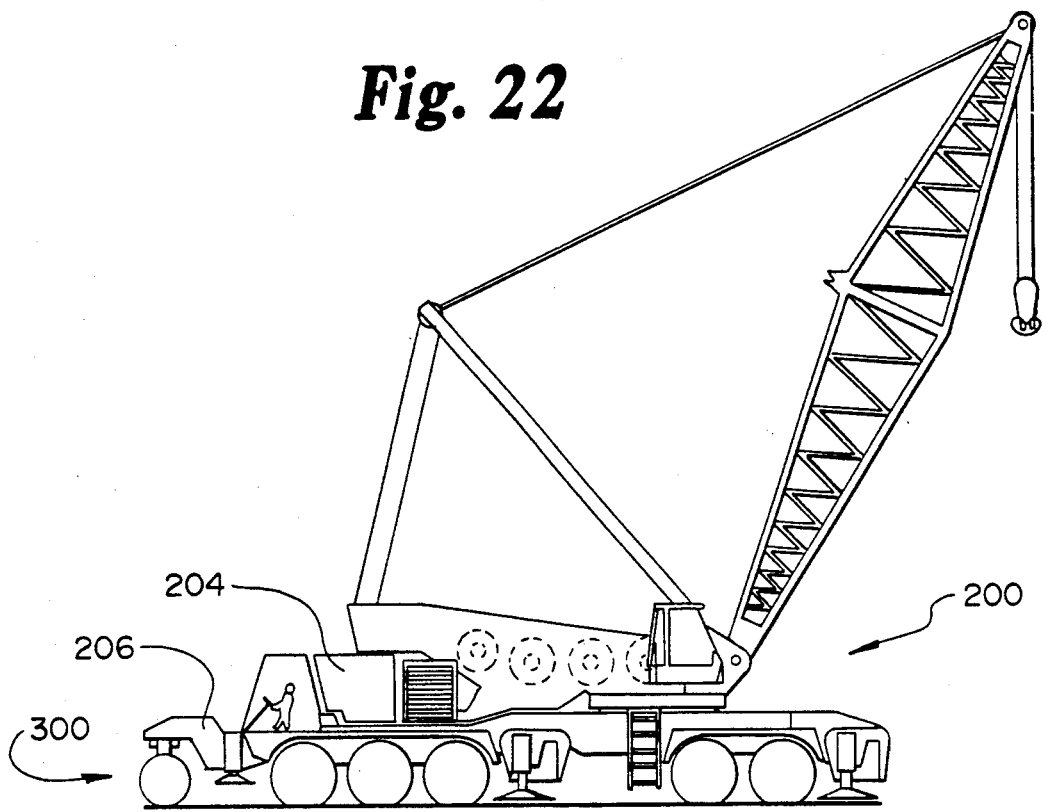
FIG. 22 is a largely schematic depiction of a vehicle including the modified form of the dolly.

The split-collar/king-pin connection and the upper end of the load column of the dolly 300 are similar to those described above with reference to the dolly 3. Thus, the dolly 300 has a self-steering capacity similar to that presented schematically in FIGS. 12, 13 and 18A–E and discussed herein with reference to the dolly 3; the tilting or sideways movement of the load column and cylinder 308 is transferred to and acts around the king-pin in the chassis 302. Just as with the dolly 3, the steering response may be selected by rotating the split-collar 306 and the king-pin within the chassis 302. The king-pin may be secured at a selected castor by pinning or locking the split-collar 306 to one of the locking blocks 310. Only two blocks 310 are shown, but a plurality, or a continuous block, may be provided to hold the king-pin at a variety of selected castors. FIG. 22 shows how the modified dolly 300 may be used with a vehicle 200 for transporting heavy or massive loads.

The present invention may be embodied in other specific forms without departing from the spirit or essential attributes thereof. For example, other mechanical linkages may be used to transfer the forces generated by the movement of the load to the steerable axle and the wheels mounted thereon. One such linkage may comprise a system of shafts and gears extending between the load and the steerable axle. Additionally, various suspension units or systems may be incorporated with the present invention; any of a variety of appropriate braking systems might be used; a sensing and display system may be provided to monitor and indicate the operational conditions of the dolly; and a lighting system (e.g., brake lights, turning signals) may be provided. It is therefore desired that the present embodiment be considered in all respects as illustrative and not restrictive, reference being made to the appended claims rather than to the foregoing description to indicate the scope of the invention.

What is claimed is:

1. A steerable dolly for use with vehicles for transporting heavy loads, said dolly for supporting a portion of the load and comprising
   a) a chassis arranged along a longitudinal axis;
   b) at least one axle aligned along an axle axis which is orthogonal to said longitudinal axis, and a plurality of ground-contacting wheels attached to said axle; said axle having a medial bore therethrough, orthogonal to said axle axis;
   c) a generally cylindrical bearing rotatably mounted in said chassis and encircling said at least one axle, said bearing having an aperture aligned with said axle medial bore;
   d) at least one king-pin received in the aligned bearing aperture and the axle medial bore, whereby said at least one axle may be pivoted about said king-pin, and whereby the cylindrical bearing, the axle and the king-pin may be rotated about said axle axis.

2. The dolly according to claim 1, further comprising a central load column having an upper end and a lower end, said upper end having means for attaching a load thereto and said lower end attached to said chassis.

3. The dolly according to claim 2, wherein said dolly has two axles.

4. A steerable, load-supporting dolly for use with vehicles for moving heavy loads, said dolly comprising:
   a) a chassis having a front end, a rear end and a central longitudinal axis extending between said ends;
   b) an upstanding load column having an upper end and a lower end, said upper end having means for connecting a load thereto and said lower end attached to said chassis;
   c) at least one king-pin having a king-pin axis;
   d) at least one wheel-supporting axle having an axle axis orthogonal to said longitudinal axis and including means for pivotally connecting said axle to said king-pin, whereby said king-pin axis extends through said axle axis and is normal thereto; and
   e) means for pivotally joining said king-pin to said chassis comprising a cylindrical collar rotatably connected to said chassis, whereby said king-pin axis is rotatably connected to said axle and to said chassis.

5. The dolly according to claim 4, wherein said king-pin is aligned at a predetermined castor angle relative to said chassis.

6. The dolly according to claim 4, wherein said dolly further comprises means for selectively varying said castor angle.

7. The dolly according to claim 6, wherein said means for selectively varying the castor angle further comprises a pair of hydraulic rams having two ends, a first end connected to said chassis and a second end connected to said means for joining said king-pin to said chassis.

8. The dolly according to claim 4, wherein said load column is connected to the chassis near its lower end by an orthogonal pair of shaft/journal arrangements, one of said arrangements being aligned with said central longitudinal axis of the chassis.

9. The dolly according to claim 8, further comprising screw means for controlling the pivotal movement of said shaft/journal arrangements relative to said chassis.

10. The dolly according to claim 4, wherein said lower end of the load column is attached directly to the chassis.

11. A steerable load-supporting dolly comprising:
   a) a chassis constructed along a longitudinal axis, said chassis having at least one axle housing aligned orthogonally to said longitudinal axis;
   b) a load column connected to said chassis, said load column having means for attachment to a load;
   c) an axle bearing assembly rotatably mounted in said at least one axle housing, said axle bearing assembly being rotatable about a bearing assembly axis orthogonal to said longitudinal axis;
   d) a king-pin rotatably mounted in said axle bearing assembly, rotatable about a king-pin axis which passes through and is normal to said bearing assembly axis; said king-pin being rotatably movable with said axle bearing assembly;
   e) an axle pivotally mounted to said king pin and supported within said axle bearing assembly to rotate therewith; and
   f) means for selectively rotating said axle bearing assembly about said bearing assembly axis, comprising at least one hydraulic ram connected between said chassis and said axle bearing assembly.

12. The dolly of claim 11, wherein said load column further comprises means for pivotal attachment to said load, the axis of said means for pivotal attachment being aligned parallel to said longitudinal axis.

13. The dolly of claim 12, wherein said load further comprises means for pivotal attachment to said chassis.

14. The dolly of claim 13, wherein said means for pivotal attachment to said chassis further comprises an equalizing pivot housing pivotally mounted to said chassis about a housing axis aligned with said longitudinal axis, and a pivot shaft affixed to said load column and pivotally mounted to said pivot housing about an axis orthogonal to said longitudinal axis.

15. The dolly of claim 14, further comprising means for fixing said equalizing pivot housing relative to said chassis to prevent movement of said equalizing pivot housing about said housing axis.

16. The dolly of claim 15, further comprising means for fixing said load column relative to said load to limit said means for pivotal attachment to said load.

17. A steerable load-supporting dolly comprising:
   a) a chassis constructed along a longitudinal axis, said chassis having at least one axle housing aligned orthogonally to said longitudinal axis;
   b) a load column connected to said chassis, said load column having means for attachment to a load;
   c) an axle bearing assembly rotatably mounted in said at least one axle housing, said axle bearing assembly being rotatable about a bearing assembly axis orthogonal to said longitudinal axis;
   d) a king-pin rotatably mounted in said axle bearing assembly, rotatable about a king-pin axis which passes through and is normal to said bearing assembly axis; said king-pin being rotatably movable with said axle bearing assembly;
   e) an axle pivotally mounted to said king pin and supported within said axle bearing assembly to rotate therewith;
   f) means for selectively pivoting said axle about said king-pin comprising at least one hydraulic ram connected between said chassis and said axle; and
   g) means for selectively locking said axle bearing assembly in a predetermined rotational position about said axle bearing assembly axis.

* * * * *